United States Patent
Goto et al.

(10) Patent No.: US 9,658,366 B2
(45) Date of Patent: May 23, 2017

(54) POLARIZING FILM AND METHOD FOR PRODUCING POLARIZING FILM

(71) Applicant: NITTO DENKO CORPORATION, Ibaraki-shi, Osaka (JP)

(72) Inventors: Shusaku Goto, Ibaraki (JP); Daisuke Ogomi, Ibaraki (JP); Yuki Nakano, Ibaraki (JP); Muniridin Yasen, Ibaraki (JP); Osamu Kaneko, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/425,760

(22) PCT Filed: Oct. 11, 2013

(86) PCT No.: PCT/JP2013/077827
§ 371 (c)(1),
(2) Date: Mar. 4, 2015

(87) PCT Pub. No.: WO2014/065140
PCT Pub. Date: May 1, 2014

(65) Prior Publication Data
US 2015/0219797 A1 Aug. 6, 2015

(30) Foreign Application Priority Data

Oct. 22, 2012 (JP) ................. 2012-232946

(51) Int. Cl.
*G02B 1/08* (2006.01)
*G02B 5/30* (2006.01)
(Continued)

(52) U.S. Cl.
CPC ............... *G02B 1/08* (2013.01); *G02B 1/111* (2013.01); *G02B 5/3033* (2013.01); *G02F 1/133528* (2013.01)

(58) Field of Classification Search
CPC ........ G02B 1/08; G02B 1/111; G02B 5/3033; G02F 1/133528
(Continued)

(56) References Cited

U.S. PATENT DOCUMENTS 2,445,579 A * 7/1948 Hyman, Jr. .......... G02B 5/3033
264/1.34
4,293,585 A  10/1981 Imada et al.
(Continued)

FOREIGN PATENT DOCUMENTS

CN  1708701 A  12/2005
CN  101960340 A  1/2011
(Continued)

OTHER PUBLICATIONS

Machine Translation of JP 57-124701-A published Aug. 3, 1982 from https://www4.j-platpat.inpit.go.jp (retrieved Mar. 21, 2016).*
(Continued)

*Primary Examiner* — Frank Font
(74) *Attorney, Agent, or Firm* — Westerman, Hattori, Daniels, & Adrian, LLP

(57) ABSTRACT

Provided is a polarizing film that is excellent in external appearance and can contribute to improving the display characteristics of an image display apparatus. A polarizing film of the present invention includes a polyvinyl alcohol-based resin film containing iodine. At least one surface side of the polyvinyl alcohol-based resin film includes a low-iodine layer.

10 Claims, 1 Drawing Sheet

EXAMPLE 1-1

COMPARATIVE EXAMPLE 1

(51) Int. Cl.
*G02F 1/1335* (2006.01)
*G02B 1/111* (2015.01)

(58) Field of Classification Search
USPC ........................................ 359/487.02; 349/96
See application file for complete search history.

(56) References Cited

U.S. PATENT DOCUMENTS

| | | | |
|---|---|---|---|
| 8,012,383 | B2 | 9/2011 | Matsumoto et al. |
| 8,308,998 | B2 | 11/2012 | Matsuda et al. |
| 9,354,372 | B2 * | 5/2016 | Kamijo ................ G02B 5/3033 |
| 2006/0110834 | A1 * | 5/2006 | Wang ..................... G01N 30/88 |
| | | | 436/164 |
| 2006/0244163 | A1 | 11/2006 | Matsumoto et al. |
| 2010/0288166 | A1 | 11/2010 | Matsuda et al. |
| 2011/0205628 | A1 * | 8/2011 | Yasen ............... B29D 11/00644 |
| | | | 359/488.01 |
| 2013/0293949 | A1 | 11/2013 | Saito et al. |
| 2016/0238770 | A1 * | 8/2016 | Goto .................... G02B 27/288 |

FOREIGN PATENT DOCUMENTS

| | | | |
|---|---|---|---|
| JP | 55007783 A * | 1/1980 | |
| JP | 56-14533 A | 2/1981 | |
| JP | 57124701 A * | 8/1982 | |
| JP | 58168020 A * | 10/1983 | |
| JP | 2000-338329 A | 12/2000 | |
| JP | 2006-509250 A | 3/2006 | |
| JP | 2008-70571 A | 3/2008 | |
| JP | 2010-26498 A | 2/2010 | |
| JP | 2010266769 A | 11/2010 | |
| JP | 2012-3173 A | 1/2012 | |
| JP | 201213764 A | 1/2012 | |
| JP | 2012-108202 A | 6/2012 | |
| JP | 2012-144690 A | 8/2012 | |
| JP | 2012-159778 A | 8/2012 | |
| TW | 201013238 A | 4/2010 | |
| WO | 2009/154050 A1 | 12/2009 | |

OTHER PUBLICATIONS

Japanese Office Action dated Sep. 29, 2015 issued in counterpart Japanese patent application No. 2013-213061 with English translation, (6 pages).
International Search Report dated Nov. 12, 2013, issued in corresponding application No. PCT/JP2013/077827.
Office Action dated Jul. 8, 2015, issued in counterpart Japanese Patent Application No. 2013-213061, with English translation (12 pages).
Office Action dated Jun. 3, 2016, issued in corresponding Chinese Patent Application No. 201380055174.1, with English translation. (13 pages).
English translation of International Search Report dated Nov. 12, 2013, issued in counterpart International Application No. PCT/JP2013/077827. (2 pages).
Office Action dated Jul. 19, 2016, issued in counterpart Korean Patent Application No. 10-2015-7010158, with English translation. (18 pages).
Office Action dated Feb. 8, 2017, issued in counterpart Chinese Application No. 201380055174.1, with English translation. (13 pages).

* cited by examiner

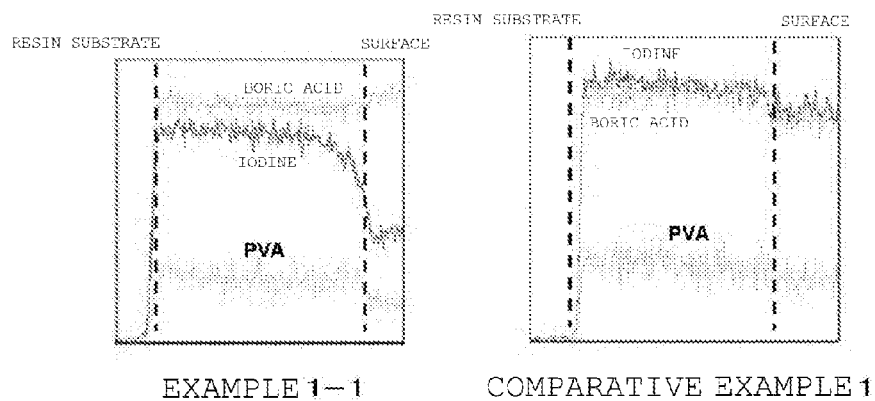

POLARIZING FILM AND METHOD FOR PRODUCING POLARIZING FILM

TECHNICAL FIELD

The present invention relates to a polarizing film and a manufacturing method for a polarizing film.

BACKGROUND ART

Polarizing films are placed on both sides of a liquid crystal cell of a liquid crystal display apparatus as a typical image display apparatus, the placement being attributable to an image-forming mode of the apparatus. For example, the following method has been proposed as a method of manufacturing the polarizing film (for example, Patent Literature 1). A laminate including a resin substrate and a polyvinyl alcohol (PVA)-based resin layer is stretched, and is then subjected to dyeing treatment so that the polarizing film is formed on the resin substrate. According to such method, a polarizing film having a small thickness is obtained. Accordingly, the method has been attracting attention because of its potential to contribute to thinning of an image display apparatus in recent years. However, the polarizing film obtained by such method is poor in external appearance, and sufficient display characteristics may not be obtained in the case of using the polarizing film in an image display apparatus.

CITATION LIST

Patent Literature

[PTL 1] JP 2000-338329 A

SUMMARY OF INVENTION

Technical Problem

The present invention has been made in order to solve the above-mentioned problems, and a main object of the present invention is to provide a polarizing film that is excellent in external appearance and can contribute to improving the display characteristics of an image display apparatus.

Solution to Problem

While focusing attention on the fact that the polarizing film having a small thickness has a markedly increased reflectance in its absorption axis direction at longer wavelengths of visible light as compared to a polarizing film having a large thickness, the inventors of the present invention have found that the above-mentioned object can be achieved by suppressing interference unevenness through the formation of a low content iodine layer as at least one surface side of the polarizing film. Thus, the present invention has been completed. It should be noted that the interference unevenness may occur mainly due to reflected light from the polarizing film and reflected light from a layer adjacent thereto (for example, adhesive layer). Specifically, the interference unevenness may occur because the polarizing film having a small thickness has high anisotropy in reflection characteristics (for example, between its absorption axis direction and its transmission axis direction), which increases a refractive index difference between the polarizing film and the adjacent layer.

According to one aspect of the present invention, a polarizing film is provided. The polarizing film includes a polyvinyl alcohol-based resin film containing iodine. At least one surface side of the polyvinyl alcohol-based resin film includes a low content iodine layer.

In one embodiment of the invention, the polyvinyl alcohol-based resin film has a thickness of 7 μm or less.

In one embodiment of the present invention, a surface of the polyvinyl alcohol-based resin film on a low content iodine layer side has an anisotropic reflection (Rc/Rp) at a wavelength of 680 nm of 1.50 or less.

According to another aspect of the present invention, a method of manufacturing method for the polarizing film is provided. The method includes bringing a treatment liquid containing a water-soluble antioxidant into contact with at least a surface of a polyvinyl alcohol-based resin membrane dyed with iodine.

In one embodiment of the present invention, the water-soluble antioxidant contains at least any one kind of ascorbic acid, thiosulfuric acid, and salts thereof.

In one embodiment of the present invention, the treatment liquid has an absorbance of light having a wavelength of 350 nm of substantially zero.

In one embodiment of the present invention, the polyvinyl alcohol-based resin membrane includes a polyvinyl alcohol-based resin layer formed on a resin substrate.

In one embodiment of the present invention, the method further includes subjecting the polyvinyl alcohol-based resin membrane to underwater stretching. The treatment with the water-soluble antioxidant is performed after the underwater stretching.

In one embodiment of the present invention, the method further includes stretching the polyvinyl alcohol-based resin membrane by adopting only an in-air stretching mode. The treatment liquid has a temperature of 50° C. or more.

According to still another aspect of the present invention, an image display apparatus is provided. The image display apparatus includes the polarizing film. The polarizing film is arranged so that a surface on a low content iodine layer side of the polarizing film is on a viewer side.

Advantageous Effects of Invention

According to one embodiment of the present invention, at least one surface side of the PVA-based resin film is the low-iodine layer, and thus the polarizing film excellent in external appearance with suppressed interference unevenness can be obtained. In addition, such polarizing film can contribute to improving the display characteristics of an image display apparatus.

BRIEF DESCRIPTION OF DRAWINGS

FIG. 1 is a graph showing an iodine concentration distribution in the thickness direction of each of polarizing films obtained in Example 1-1 and Comparative Example 1.

DESCRIPTION OF EMBODIMENTS

Embodiments of the present invention are described below. However, the present invention is not limited to these embodiments.

A. Polarizing Film

A polarizing film of the present invention includes a polyvinyl alcohol-based resin (hereinafter referred to as "PVA-based resin") film containing iodine.

Any appropriate resin may be adopted as the PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin can be appropriately selected depending on purposes. The average polymerization degree is typically from 1,000 to 10,000, preferably from 1,200 to 5,000, more preferably from 1,500 to 4,500. It should be noted that the average polymerization degree can be determined in conformity with JIS K 6726-1994.

The polarizing film is substantially a PVA-based resin film onto which iodine is adsorbed in an aligned state. In addition, at least one surface side of the PVA-based resin film is a low-iodine layer. The term "low content iodine layer" as used herein refers to a portion of the PVA-based resin film in its thickness direction where the amount of presence of iodine is decreased as compared to another portion. In addition, the term "surface side" means a portion of the PVA-based resin film in the vicinity of a surface. When at least one surface side of the PVA-based resin film is the low content iodine layer, a polarizing film excellent in external appearance with suppressed interference unevenness on the surface can be obtained. It should be noted that the amount of presence of iodine in the low content iodine layer (surface side) may correlate with an anisotropic reflection to be described later. Both surface sides of the PVA-based resin film may be the low content iodine layers, or one of the surface sides may be the low content iodine layer. In consideration of a manufacturing method to be described later, typically, one surface side of the PVA-based resin film is the low content iodine layer. The one surface side corresponds to the side of a PVA-based resin membrane on which a resin substrate is not provided in the manufacture of the PVA-based resin film (polarizing film) (the PVA-based resin membrane and the resin substrate are described later). The polarizing film is preferably arranged on the viewer side of an image display apparatus, more preferably arranged so that the one surface side is on the viewer side.

The thickness of the low content iodine layer is preferably 1,000 nm or less. With such thickness, sufficient optical characteristics (for example, single axis transmittance and polarization degree to be described later) can be secured. Specifically, when the thickness of the low content iodine layer is excessively large, the securement of sufficient optical characteristics requires, for example, that the back surface side of the polarizing film exhibit extremely high optical characteristics (iodine concentration), with the result that it may be difficult to control dyeing to be described later. On the other hand, the lower limit of the thickness of the low content iodine layer is, for example, 100 nm. When the thickness of the low content iodine layer is excessively small, the low content iodine may not function sufficiently.

The thickness of the PVA-based resin film (polarizing film) is preferably 7 µm or less, more preferably 6 µm or less. The PVA-based resin film having such thickness tends to have a high iodine concentration, and the external appearance-improving effect based on the formation of the low content iodine layer can be remarkably obtained. On the other hand, the thickness of the PVA-based resin film is preferably 1.0 µm or more, more preferably 2.0 µm or more.

When at least one surface side of the PVA-based resin film is the low content iodine layer, the reflectance of the polarizing film to be obtained in its absorption axis direction in a long wavelength region of visible light (for example, from 580 nm to 780 nm) can be reduced. The surface of the PVA-based resin film on the low content iodine layer side has an anisotropic reflection (Rc/Rp) at a wavelength of 680 nm of preferably 1.50 or less, more preferably 1.40 or less, still more preferably 1.30 or less. With such anisotropic reflection, interference unevenness on the surface can be suppressed to provide excellent external appearance. Further, when the PVA-based resin film is arranged as a polarizing film in an image display apparatus so that the surface on the low content iodine layer side exhibiting such anisotropic reflection is on the viewer side of the image display apparatus, excellent effects are exhibited in terms of external appearance and display characteristics. When the low content iodine layers are formed on both surface sides of the PVA-based resin film, the lower value is adopted as the anisotropic reflection (Rc/Rp). It should be noted that Rp represents a reflectance in the transmission axis direction of the polarizing film, and Rc represents a reflectance in the absorption axis direction of the polarizing film. Rp and Rc are values determined as ratios of reflected light intensities to incident light intensities through the detection of reflected light in the transmission axis direction and the absorption axis direction, respectively, in the case where light is allowed to fall upon the surface of the PVA-based resin film at a predetermined angle.

When at least one surface side of the PVA-based resin film is the low-iodine layer, the reflectance of the polarizing film to be obtained in its absorption axis direction in a long wavelength region of visible light (for example, from 580 nm to 780 nm) can be reduced. The surface of the PVA-based resin film on the low-iodine layer side has an anisotropic reflection (Rc/Rp) at a wavelength of 680 nm of preferably 1.50 or less, more preferably 1.40 or less, still more preferably 1.30 or less. With such anisotropic reflection, interference unevenness on the surface can be suppressed to provide excellent external appearance. Further, when the PVA-based resin film is arranged as a polarizing film in an image display apparatus so that the surface on the low-iodine layer side exhibiting such anisotropic reflection is on the viewer side of the image display apparatus, excellent effects are exhibited in terms of external appearance and display characteristics. When the low-iodine layers are formed on both surface sides of the PVA-based resin film, the lower value is adopted as the anisotropic reflection (Rc/Rp). It should be noted that Rp represents a reflectance in the transmission axis direction of the polarizing film, and Rc represents a reflectance in the absorption axis direction of the polarizing film. Rp and Rc are values determined as ratios of reflected light intensities to incident light intensities through the detection of reflected light in the transmission axis direction and the absorption axis direction, respectively, in the case where light is allowed to fall upon the surface of the PVA-based resin film at a predetermined angle.

The polarizing film preferably exhibits absorption dichroism at any one of the wavelengths of from 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

B. Manufacturing Method for Polarizing Film

The polarizing film of the present invention is typically obtained by bringing a treatment liquid containing a water-soluble antioxidant into contact with at least a surface of a PVA-based resin membrane dyed with iodine.

B-1. PVA-Based Resin Membrane

The PVA-based resin membrane is preferably a PVA-based resin layer formed on a resin substrate. The use of a laminate of the resin substrate and the PVA-based resin layer enables favorable production of a polarizing film having the above-mentioned thickness.

The laminate is typically produced by forming a PVA-based resin layer on a resin substrate (having, for example, an elongate shape). Any appropriate method may be adopted as a method of forming the PVA-based resin layer. The PVA-based resin layer is preferably formed by applying an application liquid containing a PVA-based resin onto the resin substrate, followed by drying.

Any appropriate thermoplastic resin may be adopted as a material for forming the resin substrate. Examples of the thermoplastic resin include: an ester-based resin such as a polyethylene terephthalate-based resin; a cycloolefin-based resin such as a norbornene-based resin; an olefin-based resin such as polypropylene; a polyamide-based resin; a polycarbonate-based resin; and a copolymer resin thereof. Of those, a norbornene-based resin and an amorphous polyethylene terephthalate-based resin are preferred.

In one embodiment, amorphous (uncrystallized) polyethylene terephthalate-based resins are each preferably used. Of those, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid and a copolymer further containing cyclohexane dimethanol as a glycol.

When an underwater stretching mode is adopted in stretching to be described later, the resin substrate can absorb water and can be plasticized by the action of the water as a plasticizer. As a result, a stretching stress can be significantly decreased. Accordingly, the laminate can be stretched at a high ratio and can be more excellent in stretchability than in the case of in-air stretching. As a result, a polarizing film having excellent optical characteristics can be produced. In one embodiment, the water absorption rate of the resin substrate is preferably 0.2% or more, more preferably 0.3% or more. On the other hand, the water absorption rate of the resin substrate is preferably 3.0% or less, more preferably 1.0% or less. The use of such resin substrate can prevent a problem such as the deterioration of the external appearance of the polarizing film to be obtained due to a marked decrease in dimensional stability during manufacture. In addition, the rupture of the substrate and the peeling of the PVA-based resin layer from the resin substrate during the underwater stretching can be prevented. It should be noted that the water absorption rate of the resin substrate may be adjusted by, for example, introducing a modification group into a constituent material for the resin substrate. The water absorption rate is a value determined in conformity with JIS K 7209.

The glass transition temperature (Tg) of the resin substrate is preferably 170° C. or less. When such resin substrate is used, the stretchability of the laminate can be sufficiently secured while the crystallization of the PVA-based resin layer is suppressed. Further, in consideration of the plasticization of the resin substrate by water, and favorable performance of the during the underwater stretching, stretching, the glass transition temperature (Tg) is more preferably 120° C. or less. In one embodiment, the glass transition temperature of the resin substrate is preferably 60° C. or more. The use of such resin substrate prevents a problem such as the deformation of the resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.). In another embodiment, a glass transition temperature lower than 60° C. is permitted as long as the resin substrate does not deform during the application and drying of the application liquid containing the PVA-based resin. It should be noted that the glass transition temperature of the resin substrate may be adjusted by, for example, introducing a modification group into the constituent material or heating the substrate using a crystallization material. The glass transition temperature (Tg) is a value determined in conformity with JIS K 7121.

The thickness of the resin substrate (before the stretching) is preferably from 20 μm to 300 μm, more preferably from 50 μm to 200 μm. When the thickness is less than 20 μm, it may be difficult to form the PVA-based resin layer. When the thickness exceeds 300 μm, for example, it takes a long time for the resin substrate to absorb water in the underwater stretching, and an excessively large load may be needed in the stretching.

The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin in the solution is preferably from 3 parts by weight to 20 parts by weight with respect to 100 parts by weight of the solvent. At such resin concentration, a uniform coating film in close contact with the resin substrate can be formed.

The application liquid may contain an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The resin substrate may be subjected to surface treatment (such as a corona treatment) before the formation of the PVA-based resin layer. Alternatively, an easy-adhesion layer may be formed on the resin substrate. Such treatment can improve adhesiveness between the resin substrate and the PVA-based resin layer.

The thickness of the PVA-based resin membrane (before the stretching) is preferably from 3 μm to 20 μm.

B-2. Dyeing

The dyeing of the PVA-based resin membrane is typically performed by causing the PVA-based resin membrane to adsorb iodine. A method for the adsorption is exemplified by: a method involving immersing the PVA-based resin membrane (laminate) in a dyeing liquid containing iodine; a method involving applying the dyeing liquid onto the PVA-based resin membrane; and a method involving spraying the dyeing liquid onto the PVA-based resin membrane. Of those, a method involving immersing the PVA-based resin membrane (laminate) in the dyeing liquid is preferred. This is because iodine can favorably adsorb to the film.

The dyeing liquid is preferably an aqueous solution of iodine. The amount of iodine to be contained therein is preferably from 0.1 part by weight to 0.5 part by weight with respect to 100 parts by weight of water. The aqueous solution of iodine preferably contains an iodide in order to increase the solubility of iodine in water. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The amount of the iodide to be contained is preferably from 0.02 part by weight to 20 parts by weight, more preferably from 0.1 part by weight to 10 parts by weight with respect to 100 parts by weight of water. The liquid temperature of the dyeing liquid at the time of the dyeing is preferably from 20° C. to 50° C. in order to suppress the dissolution of the PVA-based resin. In the case of immersing the PVA-based resin membrane in the dyeing liquid, an immersion time is preferably from 5 seconds to 5 minutes in order to secure the transmittance of the PVA-based resin membrane. In addition, dyeing conditions (concentration, liquid temperature, and immersion time) may be set so that the polarization degree or single axis transmittance of the polarizing film to be finally obtained falls within a predetermined range. In one embodiment, the immersion time is set so that the polarization degree of the polarizing film to be obtained is 99.98% or more. In another embodiment, the immersion time is set so that the single axis transmittance of the polarizing film to be obtained is from 40% to 44%.

The dyeing treatment may be performed at any appropriate timing. When the underwater stretching to be described later is performed, the dyeing treatment is preferably performed before the underwater stretching.

B-3. Treatment with Water-Soluble Antioxidant

The water-soluble antioxidant preferably has an action of reducing iodine. Examples of the water-soluble antioxidant include ascorbic acid (vitamin C), erythorbic acid, chlorogenic acid, citric acid, rosmarinic acid, thiosulfuric acid, and salts thereof. Examples of the salts include alkali metal salts such as a sodium salt and a potassium salt. They may be used alone or in combination. Of those, ascorbic acid, thiosulfuric acid, and salts thereof are preferred.

The treatment liquid is typically obtained by dissolving the water-soluble antioxidant in water. The amount of the water-soluble antioxidant to be contained is, for example, from 0.01 part by weight to 0.5 part by weight with respect to 100 parts by weight of the water. In one embodiment, the amount of the water-soluble antioxidant to be contained may be determined by the amount of iodine contained in the treatment liquid in advance. For example, the amount of the water-soluble antioxidant to be contained is determined by measuring the absorbance of light (light having a wavelength of 350 nm) due to an ion of iodine ($I_3^-$). Specifically, it is preferred that the water-soluble antioxidant be contained so that the absorbance of light having a wavelength of 350 nm becomes substantially zero. Through the use of such technique, the antioxidant capable of acting on iodine contained in the PVA-based resin membrane can be allowed to be present in a sufficient amount in the treatment liquid.

As a result of the contact between the PVA-based resin membrane dyed with iodine and the treatment liquid, the low content iodine layer can be favorably formed as at least one surface side of the PVA-based resin membrane. A method for the contact is exemplified by: a method involving immersing the PVA-based resin membrane (laminate) in the treatment liquid; a method involving applying the treatment liquid onto the PVA-based resin membrane; and a method involving spraying the treatment liquid onto the PVA-based resin membrane. In a preferred embodiment, the water-soluble antioxidant is contained in a treatment bath for any of various treatments to be performed after the dyeing treatment (such as stretching treatment, insolubilizing treatment, cross-linking treatment, and washing treatment), which are described later, and the PVA-based resin membrane (laminate) is immersed in the treatment bath. As described above, in one embodiment, the PVA-based resin membrane is a PVA-based resin layer formed on a resin substrate. In this case, the contact between the PVA-based resin membrane and the treatment liquid may be performed on one surface of the PVA-based resin membrane (surface on the side on which the resin substrate is not provided). Therefore, in such embodiment, the low content iodine layer may be formed on one (side on which the resin substrate is not provided) surface side of the PVA-based resin membrane.

The treatment with the water-soluble antioxidant may be performed at any appropriate timing. The timing may be determined depending on, for example, a stretching mode to be described later. As a specific example, when an underwater stretching mode is adopted, the treatment with the water-soluble antioxidant is preferably performed after the underwater stretching. This is because a large amount of iodine migrates into or out of the PVA-based resin membrane during the underwater stretching mainly depending on temperature. Specifically, even when the low content iodine layer is once formed before the underwater stretching, the amount of presence of iodine therein may increase owing to the underwater stretching.

The temperature of the treatment liquid may be appropriately set depending on, for example, the kind of the water-soluble antioxidant, the kind of the treatment bath containing the water-soluble antioxidant, and the stretching mode to be described later. For example, when only an in-air stretching mode is adopted, the temperature of the treatment liquid is preferably 50° C. or more, more preferably 55° C. or more. In the in-air stretching, the crystallization of the PVA-based resin may progress excessively. Accordingly, when the temperature of the treatment liquid is low, iodine contained in the PVA-based resin membrane may be hardly subjected to the action of the antioxidant.

B-4. Other Treatments

The PVA-based resin membrane (laminate) may be appropriately subjected to treatment for preparing the PVA-based resin membrane as a polarizing film in addition to the dyeing. Examples of the treatment for preparing the PVA-based resin membrane as a polarizing film include stretching treatment, insolubilizing treatment, cross-linking treatment, washing treatment, and drying treatment. It should be noted that the number of times, order, and the like of those treatments are not particularly limited.

Any appropriate method may be adopted as a stretching method in the stretching treatment. Specifically, fixed-end stretching may be adopted or free-end stretching (such as a method involving passing the PVA-based resin membrane between rolls having different peripheral speeds to uniaxially stretch the membrane) may be adopted.

The stretching direction may be appropriately set. In one embodiment, the PVA-based resin membrane having an elongate shape is stretched in its lengthwise direction. In this case, there is typically adopted a method involving passing the PVA-based resin membrane (laminate) between rolls having different peripheral speeds to stretch the membrane. In another embodiment, the PVA-based resin membrane (laminate) having an elongate shape is stretched in its widthwise direction. In this case, there is typically adopted a method involving stretching the membrane using a tenter stretching apparatus.

The stretching mode is not particularly limited, and may be an in-air stretching mode, or may be an underwater stretching mode. The stretching mode is preferably an underwater stretching mode. According to the underwater stretching mode, the stretching can be performed at a temperature lower than the glass transition temperature of the resin substrate or the PVA-based resin membrane (typically about 80° C.), and hence the PVA-based resin membrane can be stretched at a high ratio while its crystallization is suppressed. As a result, a polarizing film having excellent optical characteristics can be produced.

The stretching may be performed in one stage, or may be performed in a plurality of stages. When the stretching is performed in a plurality of stages, for example, the free-end stretching and the fixed-end stretching may be performed in combination, and the underwater stretching mode and the in-air stretching mode may be performed in combination. In addition, when the stretching is performed in a plurality of stages, the stretching ratio (maximum stretching ratio) of the PVA-based resin membrane to be described later is the product of stretching ratios in the respective stages.

A stretching temperature may be set to any appropriate value depending on, for example, a material for forming the resin substrate and the stretching mode. When the in-air stretching mode is adopted, the stretching temperature is, for example, the glass transition temperature (Tg) of the resin substrate or more, preferably the glass transition temperature (Tg) of the resin substrate+10° C. or more, more preferably Tg+15° C. or more. On the other hand, the stretching temperature is preferably 170° C. or less. When the stretching is performed at such temperature, rapid progress of the crystallization of the PVA-based resin can be suppressed to suppress a problem due to the crystallization (for example, the inhibition of the alignment of the PVA-based resin membrane by the stretching).

When the underwater stretching mode is adopted, the liquid temperature of a stretching bath is preferably from 40° C. to 85° C., more preferably from 50° C. to 85° C. At such temperature, the stretching can be performed at a high ratio while the dissolution of the PVA-based resin membrane is suppressed. Specifically, as described above, in consideration of the formation of the PVA-based resin layer, the glass transition temperature (Tg) of the resin substrate is preferably 60° C. or more. In this case, when the stretching temperature is less than 40° C., there is a risk in that the stretching cannot be performed favorably even in consideration of the plasticization of the resin substrate by water. On the other hand, as the temperature of the stretching bath increases, the solubility of the PVA-based resin membrane becomes higher, resulting in a higher risk of being unable to obtain excellent optical characteristics. The period of time for which the PVA-based resin membrane (laminate) is immersed in the stretching bath is preferably from 15 seconds to 5 minutes.

When the underwater stretching mode is adopted, the stretching is preferably performed by immersing the PVA-based resin membrane (laminate) in an aqueous solution of boric acid (boric acid underwater stretching). The use of the aqueous solution of boric acid as the stretching bath can impart, to the PVA-based resin membrane, rigidity enough to withstand a tension to be applied at the time of the stretching and such water resistance that the PVA-based resin membrane does not dissolve in water. Specifically, boric acid can produce a tetrahydroxyborate anion in the aqueous solution to cross-link with the PVA-based resin through a hydrogen bond. As a result, the rigidity and the water resistance can be imparted to the PVA-based resin membrane to enable favorable stretching, and hence a polarizing film having excellent optical characteristics can be produced.

The aqueous solution of boric acid is preferably obtained by dissolving boric acid and/or a borate in water as a solvent. The concentration of boric acid is preferably from 1 part by weight to 10 parts by weight with respect to 100 parts by weight of the water. When the concentration of boric acid is set to 1 part by weight or more, the dissolution of the PVA-based resin membrane can be effectively suppressed, and a polarizing film having additionally higher characteristics can be produced. It should be noted that an aqueous solution obtained by dissolving a boron compound such as borax, glyoxal, glutaric aldehyde, or the like other than boric acid or the borate in the solvent may also be used.

When the PVA-based resin membrane has adsorbed iodine in advance through the dyeing, the stretching bath (aqueous solution of boric acid) preferably contains an iodide. When the iodide is contained, the elution of iodine adsorbed by the PVA-based resin membrane can be suppressed. Specific examples of the iodide are as described above. The concentration of the iodide is preferably from 0.05 part by weight to 15 parts by weight, more preferably from 0.5 part by weight to 8 parts by weight with respect to 100 parts by weight of the water.

The stretching ratio (maximum stretching ratio) is preferably 5.0 times or more with respect to the original length of the PVA-based resin membrane (laminate). Such high stretching ratio can be achieved, for example, by adopting the underwater stretching mode (boric acid underwater stretching). It should be noted that the term "maximum stretching ratio" as used herein refers to a stretching ratio immediately before the rupture of the PVA-based resin membrane (laminate). The stretching ratio, at which the PVA-based resin membrane (laminate) ruptures, is separately identified and a value lower than the value by 0.2 is the maximum stretching ratio.

In a preferred embodiment, the PVA-based resin membrane (laminate) is subjected to in-air stretching at high temperature (for example, 95° C. or more) before being subjected to the boric acid underwater stretching and the dyeing. Such in-air stretching may be regarded as preliminary or auxiliary stretching with respect to the boric acid underwater stretching, and hence is hereinafter referred to as "in-air auxiliary stretching".

The combination with the in-air auxiliary stretching may enable the laminate to be stretched at a higher ratio. As a result, a polarizing film having more excellent optical characteristics (for example, polarization degree) can be produced. For example, when a polyethylene terephthalate-based resin is used as the resin substrate, the combination of the in-air auxiliary stretching and the boric acid underwater stretching enables the stretching to be performed while suppressing the alignment of the resin substrate as compared to the stretching by only the boric acid underwater stretching. As the alignment property of the resin substrate improves, a higher stretching tension is applied thereto, with the result that it may be difficult to stably stretch the resin substrate, or the resin substrate may rupture. Accordingly, when the stretching is performed while the alignment of the resin substrate is suppressed, the laminate can be stretched at a higher ratio.

In addition, the combination with the in-air auxiliary stretching can improve the alignment property of the PVA-based resin, to thereby improve the alignment property of the PVA-based resin even after the boric acid underwater stretching. Specifically, when the alignment property of the PVA-based resin is improved in advance by the in-air auxiliary stretching, the PVA-based resin easily cross-links with boric acid in the boric acid underwater stretching, and is stretched under a state in which boric acid serves as a junction. Presumably for this reason, the alignment property of the PVA-based resin is high even after the boric acid underwater stretching. As a result, a polarizing film having excellent optical characteristics (for example, polarization degree) can be produced.

A stretching ratio in the in-air auxiliary stretching is preferably 3.5 times or less. A stretching temperature in the in-air auxiliary stretching is preferably the glass transition temperature of the PVA-based resin or more. The stretching temperature is preferably from 95° C. to 150° C. It should be noted that the maximum stretching ratio in the case of the combination of the in-air auxiliary stretching and the boric acid underwater stretching is preferably 5.0 times or more, more preferably 5.5 times or more, still more preferably 6.0 times or more with respect to the original length of the PVA-based resin membrane (laminate).

The insolubilizing treatment is typically performed by immersing the PVA-based resin membrane (laminate) in an aqueous solution of boric acid. Water resistance can be imparted to the PVA-based resin membrane by subjecting the film to the insolubilizing treatment. The concentration of the aqueous solution of boric acid is preferably from 1 part by weight to 4 parts by weight with respect to 100 parts by weight of water. The liquid temperature of an insolubilizing bath (aqueous solution of boric acid) is preferably from 20° C. to 50° C. The insolubilizing treatment is preferably performed before the underwater stretching and the dyeing treatment.

The cross-linking treatment is typically performed by immersing the PVA-based resin membrane (laminate) in an aqueous solution of boric acid. Water resistance can be imparted to the PVA-based resin membrane by subjecting the film to the cross-linking treatment. The concentration of the aqueous solution of boric acid is preferably from 1 part by weight to 5 parts by weight with respect to 100 parts by weight of water. In addition, when the cross-linking treatment is performed after the dyeing treatment, the solution preferably further contains an iodide. When the iodide is contained therein, the elution of iodine adsorbed by the PVA-based resin membrane can be suppressed. The amount of the iodide to be contained therein is preferably from 1 part by weight to 5 parts by weight with respect to 100 parts by weight of water. Specific examples of the iodide are as described above. The liquid temperature of a cross-linking bath (aqueous solution of boric acid) is preferably from 20° C. to 60° C. The cross-linking treatment is preferably performed before the underwater stretching. In a preferred embodiment, the dyeing treatment, the cross-linking treatment, and the underwater stretching are performed in the stated order.

The washing treatment is typically performed by immersing the PVA-based resin membrane (laminate) in an aqueous solution of potassium iodide. A drying temperature in the drying treatment is preferably from 30° C. to 100° C.

C. Image Display Apparatus

An image display apparatus of the present invention includes the polarizing film. The polarizing film is arranged so that the surface on the low content iodine layer side is on the viewer side. As described above, the polarizing film of the present invention has excellent external appearance with suppressed interference unevenness in its surface. The arrangement of the polarizing film so that the surface on the low content iodine layer side is on the viewer side can contribute to improving the display characteristics of the image display apparatus (particularly at the time of black display).

Examples of the image display apparatus include a liquid crystal display apparatus and an organic EL display apparatus. When used in the liquid crystal display apparatus, the polarizing film is preferably arranged on the viewer side of a liquid crystal cell.

The polarizing film is typically used under a state in which a protective film is laminated on one side, or each of both sides, of the polarizing film. Any appropriate adhesive or pressure-sensitive adhesive is used in the lamination of the protective film. When the resin substrate is used, the resin substrate may be used as it is as the protective film without being peeled off.

It should be noted that, instead of performing the treatment with the water-soluble antioxidant, the low content iodine layer may be formed by: subjecting a PVA-based resin membrane to various treatments to produce a polarizing film; and applying an adhesive having added thereto an antioxidant onto a surface of the polarizing film, followed by the lamination of an optical member such as a protective film thereon.

EXAMPLES

The present invention is specifically described below byway of Examples. However, the present invention is not limited to Examples. It should be noted that methods of measuring characteristics are as described below.

1. Thickness

Measurement was performed with a digital micrometer (manufactured by Anritsu Corporation, product name: "KC-351C").

2. Glass Transition Temperature (Tg)

Measurement was performed in conformity with JIS K 7121.

3. Absorbance

An absorbance at a wavelength of 350 nm due to an $I_3^-$ ion in each treatment bath was measured with a spectrophotometer (UV-3150 manufactured by SHIMADZU CORPORATION). It should be noted that a quartz cell (optical path length: 10 mm) was used in the measurement.

Example 1-1

Used as a resin substrate was an amorphous polyethylene terephthalate (A-PET) film having an elongate shape, having a water absorption rate of 0.35% and a Tg of 75° C., and containing cyclohexanedimethanol as a copolymerization component (manufactured by Mitsubishi Chemical Corporation, trade name: "NOVACLEAR SH046", thickness: 100 µm).

An aqueous solution of polyvinyl alcohol having a polymerization degree of 4,200 and a saponification degree of 99.2 mol % was applied onto one surface of the resin substrate and dried at 60° C. to form a PVA-based resin layer having a thickness of 10 µm. Thus, a laminate was produced.

The resultant laminate was subjected to free-end uniaxial stretching in its longitudinal direction (lengthwise direction) at 1.8 times in an oven at 120° C. between rolls having different peripheral speeds (in-air auxiliary stretching).

Next, the laminate was immersed in an insolubilizing bath having a liquid temperature of 30° C. (aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. while the iodine concentration and the immersion time were adjusted so that the transmittance of a polarizing plate became about 42.0%. In this example, the laminate was immersed in an aqueous solution of substantially only iodine obtained by compounding 100 parts by weight of water with 0.2 part by weight of iodine and 1.0 part by weight of potassium iodide for 60 seconds (dyeing treatment).

Next, the laminate was immersed in a cross-linking bath having a liquid temperature of 30° C. (aqueous solution of boric acid obtained by compounding 100 parts by weight of water with 3 parts by weight of potassium iodide and 3 parts by weight of boric acid) for 30 seconds (cross-linking treatment).

After that, the laminate was uniaxially stretched in its longitudinal direction (lengthwise direction) between rolls having different peripheral speeds while being immersed in an aqueous solution of boric acid having a liquid temperature of 70° C. and having added thereto 0.04 part by weight of sodium thiosulfate (aqueous solution obtained by compounding 100 parts by weight of water with 4 parts by weight of boric acid and 5 parts by weight of potassium iodide) (underwater stretching). In this case, the laminate was stretched until immediately before its rupture (the maximum stretching ratio was 6.0 times).

After that, the laminate was immersed in a washing bath having a liquid temperature of 30° C. (aqueous solution obtained by compounding 100 parts by weight of water with 4 parts by weight of potassium iodide) for 5 seconds, and then dried with warm air at 60° C. (washing-drying treatment).

Thus, a polarizing film having a thickness of 4.5 µm was formed on the resin substrate.

Example 1-2

A polarizing film was formed in the same manner as in Example 1-1 except that the addition amount of sodium thiosulfate was changed to 0.2 part by weight.

Example 1-3

A polarizing film was formed in the same manner as in Example 1-1 except that 0.4 part by weight of ascorbic acid was added to the washing bath instead of adding sodium thiosulfate to the stretching bath (aqueous solution of boric acid).

Example 1-4

A polarizing film was formed in the same manner as in Example 1-1 except that 0.02 part by weight of ascorbic acid was added instead of sodium thiosulfate.

Example 1-5

A polarizing film was formed in the same manner as in Example 1-1 except that 0.01 part by weight of ascorbic acid was added instead of sodium thiosulfate.

Comparative Example 1

A polarizing film was formed in the same manner as in Example 1-1 except that sodium thiosulfate was not added to the stretching bath (aqueous solution of boric acid).

Reference Example 1

A polarizing film (thickness: 3.7 µm) was formed in the same manner as in Comparative Example 1-1 except that a PVA-based resin layer having a thickness of 8 µm was formed in the production of the laminate.

Reference Example 2

A polarizing film (thickness: 6.0 µm) was formed in the same manner as in Comparative Example 1-1 except that a PVA-based resin layer having a thickness of 14 µm was formed in the production of the laminate.

Reference Example 3

A polarizing film (thickness: 8.0 µm) was formed in the same manner as in Comparative Example 1-1 except that a PVA-based resin layer having a thickness of 18 µm was formed in the production of the laminate.

Reference Example 4

A polarizing film (thickness: 10 µm) was formed in the same manner as in Comparative Example 1-1 except that a PVA-based resin layer having a thickness of 22 µm was formed in the production of the laminate.

Example 2

Used as a resin substrate was a norbornene-based resin film having an elongate shape and a Tg of 130° C. (manufactured by JSR Corporation, trade name: "ARTON", thickness: 150 µm).

An aqueous solution of a polyvinyl alcohol (PVA) resin having a polymerization degree of 2,600 and a saponification degree of 99.0 mol % (manufactured by The Nippon Synthetic Chemical Industry Co., Ltd., trade name: "GOHSENOL (trademark) NH-26") was applied onto one surface of the resin substrate and dried at 80° C. to form a PVA-based resin layer having a thickness of 7 µm. Thus, a laminate was produced.

The resultant laminate was stretched in its widthwise direction up to a stretching ratio of 4.5 times under heating at 140° C. with a tenter apparatus by free-end uniaxial stretching. The PVA-based resin layer after the stretching treatment had a thickness of 3 µm (in-air stretching).

Next, the laminate was immersed in a dyeing bath having a liquid temperature of 30° C. (aqueous solution of substantially only iodine obtained by compounding 100 parts by weight of water with 0.5 part by weight of iodine and 3.5 parts by weight of potassium iodide) for 60 seconds (dyeing treatment).

Next, the laminate was immersed in a cross-linking bath having a liquid temperature of 60° C. and having added thereto 0.06 part by weight of ascorbic acid (aqueous solution of boric acid obtained by compounding 100 parts by weight of water with 5 parts by weight of potassium iodide and 5 parts by weight of boric acid) for 60 seconds (cross-linking treatment).

After that, the laminate was immersed in a washing bath (aqueous solution obtained by compounding 100 parts by weight of water with 3 parts by weight of potassium iodide), and then dried with warm air at 60° C.

Thus, a polarizing film having a thickness of 2.5 μm was formed on the resin substrate.

Comparative Example 2

A polarizing film was formed in the same manner as in Example 2 except that ascorbic acid was not added to the cross-linking bath.

One surface (surface on which the resin substrate was not provided: surface on the low content iodine layer side in each of Examples) of the polarizing film obtained in each of Examples, Comparative Examples, and Reference Examples was measured for its reflectances as described below, and its anisotropic reflection was calculated. In addition, the surface in question of each obtained polarizing film was evaluated for its external appearance (interference unevenness) by visual observation. Table 1 and Table 2 show the evaluation results.

(Reflectance)

A reflectance in a transmission axis direction (Rp) and a reflectance in an absorption axis direction (Rc) were measured with a spectrophotometer (manufactured by Hitachi High-Technologies Corporation, U-4100). In the measurement, the incidence angle of a light source was set to 5°, and a measurement wavelength was set to 680 nm.

It should be noted that the anisotropic reflection was calculated by Rc/Rp.

TABLE 1

| | | Antioxidant | Concentration (part by weight) | Treatment bath | | Absorbance | Thickness (μm) | Reflectance | | Anisotropic reflection (Rc/Rp) | Interference unevenness |
| | | | | Added to | Liquid temperature | | | Rc | Rp | | |
| --- | --- | --- | --- | --- | --- | --- | --- | --- | --- | --- | --- |
| Example | 1-1 | Na thiosulfate | 0.04 | Stretching bath | 70° C. | 0.0 | 4.5 | 4.0 | 3.5 | 1.14 | Extremely favorable |
| | 1-2 | Na thiosulfate | 0.2 | Stretching bath | 70° C. | 0.0 | 4.5 | 4.0 | 3.8 | 1.05 | Extremely favorable |
| | 1-3 | Ascorbic acid | 0.4 | Washing bath | 30° C. | 0.0 | 4.5 | 4.8 | 4.0 | 1.20 | Extremely favorable |
| | 1-4 | Ascorbic acid | 0.02 | Stretching bath | 70° C. | 0.0 | 4.5 | 4.5 | 4.2 | 1.07 | Extremely favorable |
| | 1-5 | Ascorbic acid | 0.01 | Stretching bath | 70° C. | 0.0 | 4.5 | 4.6 | 4.2 | 1.08 | Extremely favorable |
| Comparative Example | 1 | — | — | — | — | 1.0 | 4.5 | 6.6 | 4.3 | 1.53 | Unfavorable |
| Reference Example | 1 | — | — | — | — | 1.0 | 3.7 | 5.7 | 3.8 | 1.52 | Unfavorable |
| | 2 | — | — | — | — | 1.0 | 6.0 | 5.1 | 3.9 | 1.31 | Favorable |
| | 3 | — | — | — | — | 1.0 | 8.0 | 4.5 | 3.9 | 1.15 | Extremely favorable |
| | 4 | — | — | — | — | 1.0 | 10 | 5.1 | 5.0 | 1.02 | Extremely favorable |

TABLE 2

| | | Antioxidant | Concentration (part by weight) | Treatment bath | | Absorbance | Thickness (μm) | Reflectance | | Anisotropic reflection (Rc/Rp) | Interference unevenness |
| | | | | Added to | Liquid temperature | | | Rc | Rp | | |
| --- | --- | --- | --- | --- | --- | --- | --- | --- | --- | --- | --- |
| Example | 2 | Ascorbic acid | 0.06 | Cross-linking bath | 60° C. | 0.0 | 2.5 | 5.0 | 4.2 | 1.19 | Extremely favorable |
| Comparative Example | 2 | — | — | — | — | 1.0 | 2.5 | 8.6 | 3.8 | 2.25 | Unfavorable |

The polarizing film of each of Examples exhibited a low anisotropic reflection, and was excellent in external appearance with suppressed interference unevenness.

The polarizing films obtained in Example 1-1 and Comparative Example 1 were each measured for the concentration distribution of iodine in its thickness direction. The measurement was performed with a time-of-flight secondary ion mass spectrometer (TOF-SIMS) (manufactured by ION-TOF, product name: TOF-SIMS 5) using $Bi_3^{2+}$ as a primary ion. FIG. 1 shows the evaluation results. It was confirmed that a low content iodine layer having a small amount of presence of iodine was formed on one (side on which the resin substrate was not provided) surface side of the polarizing film of Example 1-1.

The polarizing film of the present invention is suitably used for liquid crystal panels of, for example, liquid crystal televisions, liquid crystal displays, cellular phones, digital cameras, video cameras, portable game machines, car navigation systems, copying machines, printers, facsimile machines, timepieces, and microwave ovens. The polarizing film of the present invention is also suitably used as an antireflection film for an organic EL panel.

The invention claimed is:

1. A polarizing film, comprising a polyvinyl alcohol-based resin film dyed substantially with only iodine, wherein at least one surface side of the polyvinyl alcohol-based resin film comprises a low content iodine layer.

2. The polarizing film according to claim 1, wherein the polyvinyl alcohol-based resin film has a thickness of 7 μm or less.

3. The polarizing film according to claim 1, wherein a surface of the polyvinyl alcohol-based resin film on the low content iodine layer side has an anisotropic reflection determined from the following equation (1) at a wavelength of 680 nm of 1.50 or less:

anisotropic reflection=$Rc/Rp$    (1)

where:
Rp represents a reflectance in the transmission axis direction of the polarizing film, and
Rc represents a reflectance in the absorption axis direction of the polarizing film.

4. A manufacturing method for the polarizing film of claim 1, the manufacturing method comprising bringing a treatment liquid containing a water-soluble antioxidant into contact with at least a surface of a polyvinyl alcohol-based resin membrane dyed with the iodine.

5. The manufacturing method according to claim 4, wherein the water-soluble antioxidant contains at least any one kind of ascorbic acid, thiosulfuric acid, and salts thereof.

6. The manufacturing method according to claim 4, wherein the treatment liquid has an absorbance of light having a wavelength of 350 nm of substantially zero.

7. The manufacturing method according to claim 4, wherein the polyvinyl alcohol-based resin membrane comprises a polyvinyl alcohol-based resin layer formed on a resin substrate.

8. An image display apparatus, comprising the polarizing film of claim 1,
wherein the polarizing film is arranged so that a surface on the low content iodine layer side of the polarizing film is on a viewer side.

9. A manufacturing method for a polarizing film comprising a polyvinyl alcohol-based resin film dyed substantially with only iodine, wherein at least one surface side of the polyvinyl alcohol-based resin film comprises a low content iodine layer, the manufacturing method comprising:
bringing a treatment liquid containing a water-soluble antioxidant into contact with at least a surface of a polyvinyl alcohol-based resin membrane dyed with the iodine;
subjecting the polyvinyl alcohol-based resin membrane to underwater stretching,
wherein the treatment with the water-soluble antioxidant is performed after the underwater stretching.

10. A manufacturing method for a polarizing film comprising a polyvinyl alcohol-based resin film dyed substantially with only iodine, wherein at least one surface side of the polyvinyl alcohol-based resin film comprises a low content iodine layer, the manufacturing method comprising:
bringing a treatment liquid containing a water-soluble antioxidant into contact with at least a surface of a polyvinyl alcohol-based resin membrane dyed with the iodine;
stretching the polyvinyl alcohol-based resin membrane by adopting only an in-air stretching mode,
wherein the treatment liquid has a temperature of 50° C. or more.

* * * * *